June 23, 1964 E. KRANTZ 3,138,441
GAS PURIFICATION APPARATUS
Filed May 10, 1961
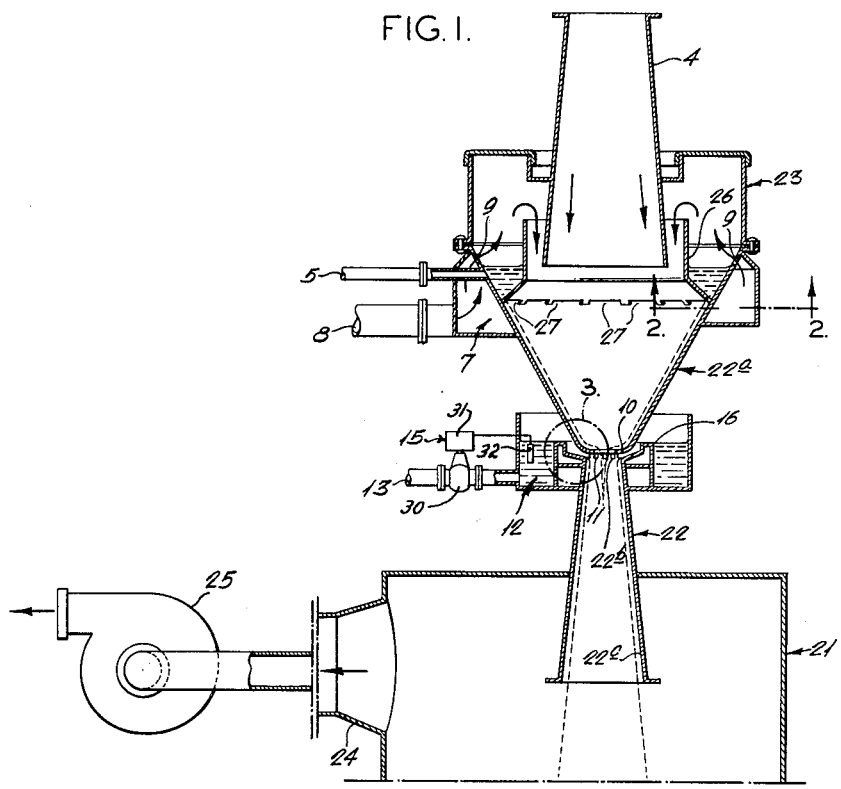
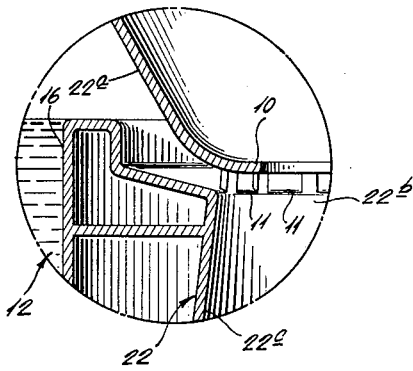
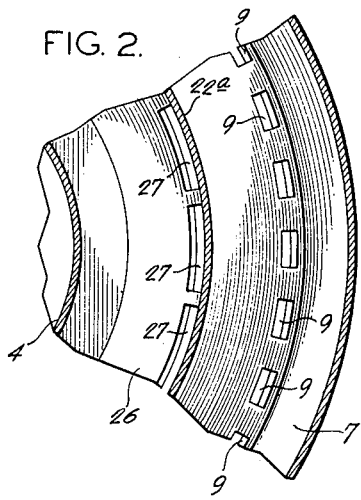
INVENTOR:
EVERT KRANTZ
BY Howson & Howson
ATTYS.

United States Patent Office 3,138,441
Patented June 23, 1964

3,138,441
GAS PURIFICATION APPARATUS
Evert Krantz, Stockholm, Sweden, assignor to Aktiebolaget Svenska Flaktfabriken, Stockholm, Sweden
Filed May 10, 1961, Ser. No. 109,182
Claims priority, application Sweden May 12, 1960
3 Claims. (Cl. 55—227)

The present invention relates to gas purification apparatus for separating dust and paint particles from a flowing stream of gas. The invention has particular application to purification apparatus having a separator with a Venturi-shaped gas inlet channel, in the narrowest section or throat of which moistening liquid is dispersed and admixed into the flowing gas.

A primary object of the present invention is to prevent effectively the deposit of dust or paint particles on the walls of the outlet section of the gas channel downstream of the throat.

More specifically, the present invention provides means to form a liquid layer covering the walls of the outlet section of the gas channel including slots in the channel walls immediately downstream of the point of dispersion and admixture and a liquid supply tank surrounding the channel to supply liquid to said slots, the film covering the walls of the outlet section of the gas channel.

In accordance with a preferred embodiment of the present invention, the liquid supply tank surrounding the gas channel is open to the surrounding atmosphere, and the slots which are at right angles to the flow of the gas are sufficiently large to permit the suction which prevails downstream of the point of dispersion and admixture to cause a flow of atmosphere which sweeps the liquid layer and cooperates with the liquid layer to prevent deposit of dust or paint particles on the walls of the outlet sections of the gas channel.

All of the objects of the invention are more fully set forth hereinafter with reference to the accompanying drawing wherein:

FIG. 1 is a vertical cross section through a gas inlet channel embodying the present invention;

FIG. 2 is an enlarged inverted sectional view taken on the line 2—2 of FIG. 1 and FIG. 3 is an enlarged view of the portion circled at 3 in FIG. 1.

Referring to the drawing, the illustrated embodiment of the gas purification apparatus which is of the so-called wet scrubber type, includes a separating chamber, the upper part of which is shown at 21, having an inlet channel 22 of a venturi shape and a clean-gas outlet 24 for the gas which has been purified. A fan is provided, for example as indicated at 25 to effect flow of gas through the separator 21. The inlet channel 22 in the present instance is connected at its top to a closed chamber 23 into which a supply duct 4 projects for introducing the gas to be cleaned.

In order to effect better separation of the dust or paint particles carried by the gas, means is provided to disperse and admix washing liquid into the gas stream prior to its entry into the separator 21. To this end, an annular trough 26 is mounted in the channel 22 at the top of the entrance section 22a thereof. The washing liquid is supplied to the trough as indicated at 5 and is caused to flow down the walls of the inflow section 22a by reason of a series of perforations 27 in the bottom of the trough 26. In order to prevent dust deposits at the mouth of the supply duct 4, a closed chamber 7 surrounds the inflow section 22a. The chamber 7 has an inlet 8 for air and a plurality of apertures 9 for exhausting the air into the chamber 23. As indicated by the arrows in FIG. 1, the air flows into the inflow section 22 through the clearance space between the trough 26 and the inlet duct 4. By reason of this construction, the liquid introduced at 5 flows along the converging walls of the inlet section 22a. An inwardly projecting flange or shoulder 10 is provided at the throat 22b of the Venturi channel 22 to disperse and admix the liquid into the gas stream flowing therethrough.

In accordance with the invention, means is provided to introduce liquid into the channel 22 immediately downstream of the flange or shoulder 10. To this end, the throat 22b is provided with slots 11 whch extend at right angles to the direction of flow of the gas therethrough. A liquid supply tank 12 surrounds the throat 22b. Liquid is introduced into the tank 12 by means of a liquid inlet 13 having control means 15 for regulating the supply of liquid. In the present instance the control means 15 comprises a valve 30, located in the liquid inlet 13, having a regulator 31 which opens or closes the valve 30, upon actuation of a level sensing means 32, thereby increasing or decreasing the flow of liquid to the tank 12 as required. Thus the control means 15 adjusts the liquid level in the tank 12 relative to a dam or weir 16 provided in the tank 12 which controls the flow through the slots 11 to provide a film which completely covers the diverging wall 22c of the outlet portion of the channel 22. The separator 21 may be of any well known design which operates to collect the washing liquid, and which by baffles, scrubbers or the like, intermediate the gas outlet 24 and the bottom of the channel 22, operates to separate the gas and the admixed washing liquid thereby permitting relatively clean, dry gas to pass from the gas outlet 24.

In accordance with another feature of the present invention, the liquid tank 12 is open and communicates with the surrounding atmosphere, and the slots 11 are sufficiently large to permit the intake of air therethrough. The restricted throat 22b of the channel 22 creates a suction downstream of the flange or shoulder 10 which causes the air entering the slots 11 to sweep the liquid layer on the wall 22c. The air cooperates with the liquid layer to prevent the deposit of dust or paint particles on the wall 22c.

While a particular embodiment of the present invention has been herein illustrated and described, it is not intended to limit the invention to such disclosure, but changes and modifications may be made therein and thereto within the scope of the following claims.

What I claim is:

1. A gas purification apparatus including a separator and a Venturi-shaped gas inlet channel, said inlet channel having a converging inlet portion terminating in a reduced throat portion and a diverging outlet portion extending from said throat and terminating in said separator, means to supply washing liquid at the upper part of said inlet portion to form a downflowing film of washing liquid on the converging wall thereof and shoulder means in said throat section to disperse and admix said downflowing liquid into the gas flowing therethrough, means defining slots in said throat downstream of said shoulder means, a liquid supply tank surrounding said throat to introduce washing liquid into the outlet portion of said channel through said slots, means to supply liquid to said tank, and control means to regulate the flow of liquid through said slots, said slots being positioned at the upper edge of said divergent outlet portion adjacent said throat whereby liquid from said liquid supply tank flows through said slots to provide a liquid layer covering the inner walls of said outlet portion of said channel.

2. Gas purification apparatus according to claim 1 wherein said liquid control means comprises a dam in said tank and means to regulate the liquid level in said tank relative to said dam to effect the desired control of the liquid flow through said slots.

3. Gas purification apparatus according to claim 1 wherein said tank is open to the atmosphere and said slots are sufficiently large to permit the flow of air into said throat through said slots to sweep the liquid layer on said walls of the outlet portion to prevent the deposit of dust and paint particles thereon.

References Cited in the file of this patent

UNITED STATES PATENTS

| | | |
|---|---|---|
| 681,893 | Stilwell | Sept. 3, 1901 |
| 1,800,356 | Powell | Apr. 14, 1931 |
| 2,604,185 | Johnstone et al. | July 22, 1952 |
| 2,797,904 | Voorheis | July 2, 1957 |
| 2,871,973 | Roujob | Feb. 3, 1959 |
| 2,883,167 | Krantz | Apr. 21, 1959 |
| 3,009,687 | Hendriks | Nov. 21, 1961 |

FOREIGN PATENTS

| | | |
|---|---|---|
| 135,832 | Germany | Nov. 4, 1902 |
| 1,027,636 | Germany | Apr. 10, 1958 |